United States Patent [19]

Chiolle et al.

[11] Patent Number: 5,236,979
[45] Date of Patent: Aug. 17, 1993

[54] ELASTOMERIC THERMOPLASTIC COPOLYETHER-ESTERS ENDOWED WITH IMPROVED THERMAL AND HYDROLITIC STABILITIES

[75] Inventors: Antonio Chiolle; Gian P. Maltoni, both of Ferrara, Italy

[73] Assignee: ECP Enichem Polimeri S.r.l., Milan, Italy

[21] Appl. No.: 868,136

[22] Filed: Apr. 14, 1992

[30] Foreign Application Priority Data

Apr. 19, 1991 [IT] Italy .................. MI91A001091

[51] Int. Cl.$^5$ ............................................. C08K 5/527
[52] U.S. Cl. ........................................ 524/120; 524/342; 524/604; 524/605
[58] Field of Search ............ 524/342, 120, 604, 605; 528/300

[56] References Cited

U.S. PATENT DOCUMENTS

| | | | |
|---|---|---|---|
| 3,856,749 | 12/1974 | Hoeschle | 524/255 |
| 4,156,702 | 5/1979 | Edinger | 524/153 |
| 4,371,647 | 2/1983 | Minagawa et al. | 524/120 |
| 4,985,481 | 1/1991 | Neri et al. | 524/120 |
| 5,049,603 | 9/1991 | Mochizuki | 524/120 |
| 5,106,892 | 4/1992 | Chiolle et al. | 524/120 |

OTHER PUBLICATIONS

Rubber World, Aug. 17-24, 1982.

*Primary Examiner*—Veronica P. Hoke
*Attorney, Agent, or Firm*—Oblon, Spivak, McClelland, Maier & Neustadt

[57] ABSTRACT

The thermal and hydrolytic stabilities of the elastomeric thermoplastic copolyether-esters are remarkably improved by the addition of a synergistic mixture consisting of an tri (hydroxybenzyl) benzene and of a bis (alkyl-phenyl) pentaerythritol diphosphite.

The copolyether-esters thus compounded find use in the extrusion, blow and injection molding technologies.

15 Claims, No Drawings

ELASTOMERIC THERMOPLASTIC COPOLYETHER-ESTERS ENDOWED WITH IMPROVED THERMAL AND HYDROLITIC STABILITIES

The present invention relates to elastomeric thermoplastic copolyether-esters endowed with improved thermal and hydrolytic stabilities.

More particularly, the present invention relates to elastomeric thermoplastic copolyether-esters endowed with high rheological and mechanical properties and improved resistances to the thermo-oxidation and to hydrolysis, particularly suitable for being transformed into shaped articles both by blow-molding extrusion and injection molding.

The elastomeric thermoplastic copolyether-esters are materials distinguishing in the rubber field by their high physical and mechanical properties, such as toughness, fatigue resistance, impact resistance, abrasion resistance, and the like, as well as by their oil and gasoline resistances. In spite of these properties which are meaning fully higher than those of the copolyesters, the elastomeric thermoplastic copolyether-esters exhibit a poor resistances to thermo-oxidation and to the hydrolysis.

It is known, in fact, that the elastomeric copolyether-esters tend to degrade when subjected to an extended exposure at temperatures higher than 150° C. This drawback drastically reduces the fields wherein the copolyether-esters may be used.

Moreover, the copolyether-esters undergo a hydrolysis of the ester groups when they are dipped in water for an extended period of time.

In order to overcome this drawback, it is known tecnique to add to the copolyether-esters a stabilizing product.

Many stabilizing products have been proposed for this end, but none of them allowed to solve the problem exhaustively and without undesired effects.

Thus, for example, it is known from U.S. Pat. Nos. 3,193,522 and 3,193,524 to add polycarbodiimides for improving the resistances to the thermo-oxidation, to the hydrolysis and to the light of polyesters.

The effectiveness of these compounds, however, is somewhat limited, since the low molecular weight polycarbodiimides are readily extracted by solvents or mineral oils, they have a tendency to migrate to the surface and result ineffective at high temperatures because they have a tendency to undergo polymerization, thereby destroying the reactivity of the carbodiimide group and thus the stabilization action of the composition.

Other carbodiimides such as, for example, those containing other functional groups, such as hydroxyl group, have been proposed as stabilizing agents; however, also these compounds tend to react with themselves, and, often, a loss of the activity occurs following the storability.

To overcome all the above drawbacks, it has been proposed the use, as stabilizers for polyesters, of polycarbodiimides having a molecular weight of at least 500 and having at least 3 carbodiimide groups in the molecule (see U.S. Pat. No. 3,193,522).

U.S. Pat. No. 3,896,078 proposes to improve the resistance to thermo-oxidation of the copolyether-esters by incorporating into the polymer an effective amount of amide linkage containing material, wich on hydrolysis yields primary amino groups and carboxylic groups, together with an antioxidant of arylamine or hindered phenol type. A typical example of amide linkage containing compound is 1,6-bis [3-(3,5-di-tert.butyl-4-hydroxyphenyl)propionamide]hexane, known on the market by the trade-mark IRGANOX 1098 ®.

The elastomeric thermoplastic copolyether-esters stabilized by the above compounds exhibit, however, a poor stability toward thermo-oxidation with the time. In fact, they tend to color yellow after some days of treatment in oven at 150° C. in air. Furthermore, the stability to hydrolysis of these stabilized elastomeric copolyether-esters is not completely satisfactory for well determined applications wherein such a property is required.

It has been now found that the resistance toward thermooxidative degradation and the resistance to the hydrolysis of the elastomeric thermoplastic copolyether-estersmay be greatly enhanced by incorporating into such polymers an effective amount of a synergistic mixture consisting of a tris (hydroxy-benzyl) benzene and a bis (alkyl-phenyl) pentaerythritol diphosphite.

The amount of the synergistic stabilizing mixture to be added is generally comprised between 0.01 and 10% by weight with respect to the elastomeric copolyester, and preferably between 0.2 and 5% by weight.

The weight ratio between the bis (alkyl-phenyl) pentaerythritol diphosphite and the tris (hydroxy-benzyl) benzene in the synergistic mixture of the present invention can be varied within a wide range even if ratios comprised between 3:1 and 1:3 are preferred; particularly a bis (alkyl-phenyl) pentaerythritol diphosphite tris (hydroxy-benzyl) benzene weight ratio of about 2:1 has been found particularly advantageous.

The tris (hydroxy-benzyl) benzene used in the stabilizing mixture of the present invention has general formula:

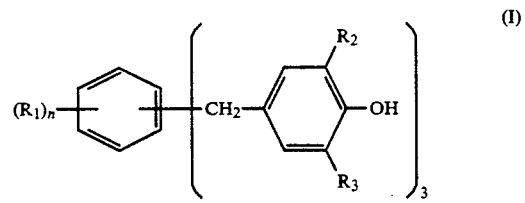

wherein: $R_1$, $R_2$ and $R_3$, which may be equal to or different from each other, represent an alkyl group, preferably containing from 1 to 8 carbon atoms and n is an integer comprised between 1 and 3.

It is preferred that at least one of $R_2$ and $R_3$ radicals, and preferably both the radicals, are alkyls containing from 3 to 8 carbon atoms and are branched on the carbon atoms in alpha-position.

The preferred compounds of formula (I) are the symmetrical hexasubstituted benzenes. These compounds are the 1,3,5-trialkyl-2,4,6-tris(3,5-dialkyl-4-hydroxybenzyl)benzenes having the formula:

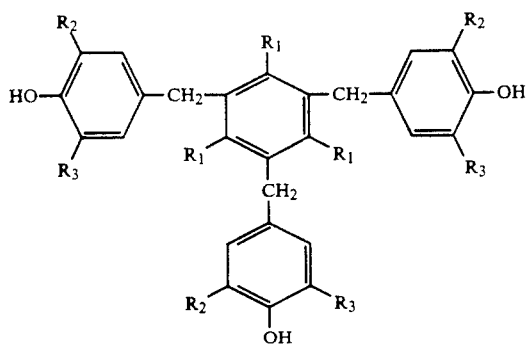

wherein $R_1$, $R_2$ and $R_3$ have the significances set forth above.

Typical examples of compounds which may be used as costabilizers in the synergistic mixture of the present invention are:

1,3,5-tri-methyl-2,4,6-tri(3,5-di-tert.butyl-4-hydroxybenzyl)benzene;

1,3,5-tri-ethyl-2,4,6-tri(3,5-di-tert. butyl-4-hydroxybenzyl)benzene;

1,3,5-tri-methyl-2,4,6-tri (3,5-di-isopropyl-4-hydroxybenzyl)benzene;

1,3,5,-tri-octyl-2,4,6-tri (3,5-di-tert.butyl -4-hydroxybenzyl)benzene;

1,3,5-tri-ethyl-2,4,6-tri (3,5-di-tert.amyl -4-hydroxybenzyl)benzene;

1,3,5,-tri-butyl-2,4,6-tri (3-isopropyl-5-tert.amyl-4-hydroxybenzyl)benzene;

1,3,5-tri-propyl-2,4,6-tri (3,5-di-tert.octyl -4-hydroxybenzyl)benzene.

Among these, the particularly preferred compounds are those having three 3,5 - di-tert. butyl - 4 -hydroxybenzyl radicals.

These compounds and their preparation processes are known in the literature and disclosed in U.S. Pat. Nos. 3,026,264; 4,340,767 and 4,754,077.

Particularly, the 1,3,5 - tri-methyl - 2,4,6 -tri(3,5 -di-tert. butyl - 4 - hydroxybenzyl)benzene is benzene; known on the market by the trade name ETHANOX 330 ® of the ETHYL Corporation Society.

The bis (alkyl-phenyl)-pentaerythritol diphosphite used in the synergistic mixture of the present invention, corresponds to the general formula:

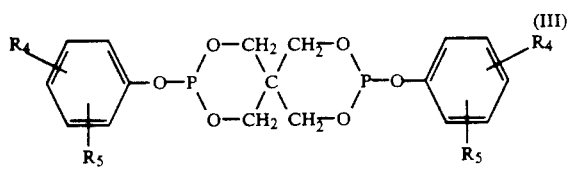

wherein $R_4$ and $R_5$, which can be either equal or different from each other, are alkyl radicals containing from 1 to 10 carbon atoms.

All the above compounds and their preparation are well known in the literature and disclosed in U.S. Pat. Nos. 3,281,381; 3,310,609; 3,192,243 and 3,205,269, the content thereof is integral part of the present description as a reference.

The preferred bis-(alkyl-phenyl)-pentaerythritol diphosphites are those corresponding to the formula:

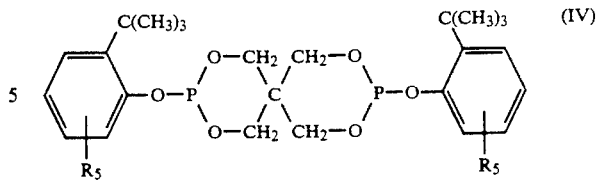

wherein $R_5$ is an alkyl radical containing from 1 to 6 carbon atoms.

A particularly preferred compound is bis-(2,4-di-tert.butyl-phenyl) -pentaerythritol diphosphite known in the market with the trade name ULTRANOX ® 626 produced and sold by BORG WARNER Chemicals.

Any elastomeric thermoplastic copolyether-ester containing ester bonds

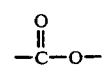

and ether bonds —C—O—C— may be stabilized by the synergistic mixture of the present invention, provided that said polyether-esters exhibit a softening or melting temperature lower than 250° C., which is the temperature at which the stabilizing system usually is no more effective.

The elastomeric thermoplastic copolyether-esters having a segmented structure are particularly preferred. These elastomeric thermoplastic copolyether-esters consist of a multiplicity of repeating long-chain ester units and of repeating short-chain ester units connected to each other in head-to-tail fashion through linkages of the ester type. Said long-chain ester units are represented by general formula:

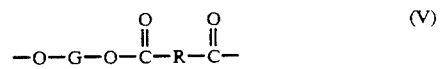

and said short-chain ester units are represented by general formula:

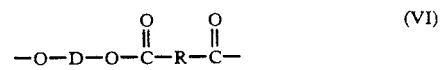

wherein:

G is a divalent group remaining after the removal of the terminal hydroxy groups from a poly-(alkylene oxide) glycol having an molecular weight of from about 250 to 6,000 and a carbon/oxygen ratio of about 1.8 to 4.3;

R is a divalent group remaining after the removal of the carboxylic group from a dicarboxylic acid having a molecular weight lower than about 300; and D is a divalent radical remaining after the removal of the hydroxylic groups from a diol having a molecular weight lower than about 250.

In said copolyether-esters the short-chain ester units of general formula (VI) are present in an amount of about 15 to 95% by weight, preferably 33 to 86% by weight, with respect to the weight of the copolyester; the remaining part being composed of long-chain ester units of general formula (V).

Said elastomeric copolyether-esters are well known in the literature and described, for example, in U.S. Pat.

Nos. 3,023,192 and 3,651,015; Italian Patent Nos. 947589, 963304 and 973059 and published Italian Patent Application No. 21212 filed on Jul. 4, 1988.

The expression "long-chain ester units" refers to the reaction product of a poly(alkylene oxide) glycol with a dicarboxylic acid, resulting in ester units represented by the above formula (V).

As poly(alkylene-oxide) glycols there may be used those which contain from 2 to 10 carbon atoms in the alkylene group, such as poly-(1,2- and 1,3-propylene-oxide)-glycol; poly-(tetramethylene-oxide)-glycol; poly-(pentamethylene-oxide)-glycol; poly-(hexamethylene-oxide)-glycol; poly-(heptamethylene-oxide)-glycol; poly-(octamethylene-oxide)-glycol; poly-(nonamethylene-oxide)-glycol; poly-(decamethylene-oxide)-glycol; and poly-(1,2-butylene-oxide)-glycol; OH terminated polybutene-1-polybutadiene; random copolymers or block copolymers of ethylene-oxide and 1,2-propylene-oxide; and the like.

In the present invention, particularly preferred is poly-(tetramethylene-oxide)-glycol having a very narrow average distribution of the molecular weights, such as, for example, a Mw/Mn ratio lower than 2, which generally results in an improved resistance to fluids such as oils, gasoline, water, fats etc.

The expression "short-chain ester units" relates to the reaction product of a diol having a low molecular weight (lower than about 250) with a dicarboxylic acid in order to form ester units represented by the above formula (VI).

Among the diols having a low molecular weight which by reaction produce the short-chain ester units, non-cyclic, alicyclic and aromatic di-hydroxy compounds are included. Diols of from 2 to 15 carbon atoms such as ethylene-glycol, propylene-glycol, isobutylene-glycol, tetramethylene-glycol, pentamethylene-glycol, 2,2-dimethyl-trimethylene-glycol, hexamethylene-glycol and decamethylene-glycol, di-hydroxycyclohexane, cyclohexane-dimethanol, resorcinol, hydroquinone, 1,5-di-hydroxy-naphthalene, etc. are preferred.

Particularly preferred are aliphatic diols containing from 2 to 8 carbon atoms.

Examples of di-hydroxy aromatic compounds which may be used are bisphenols, such as bis-(p-hydroxy)-diphenyl, bis-(p-hydroxyphenyl)-methane, and bis-(p-hydroxyphenyl)-propane, etc.

The term "low-molecular-weight diols" as used herein should hence be understood as also including all of the equivalent derivatives suitable for forming esters, although the molecular weight requirement refers exclusively to the basic diol, and not to the derivatives thereof.

However, 1,4-butane-diol is particularly preferred for the purpose of the present invention.

Dicarboxylic acids which are reacted with the above poly(alkylene oxide) glycols and with the low molecular weight diols to yield the copolyether-esters of the present invention are aliphatic, cycloaliphatic and/or aromatic dicarboxylic acids having a low molecular weight, i.e., having a molecular weight of preferably less than about 300.

The term "dicarboxylic acids" also includes equivalent derivatives of dicarboxylic acids which show a behaviour similar to that of dicarboxylic acids in the reaction with glycols and diols to form copolyether-ester polymers. These equivalent compounds include esters and ester-forming derivatives such as, e.g. acid halides and anhydrides. The molecular weight requirement, however, relates exclusively to the acid, and not to its corresponding esters or other ester-forming derivatives.

Therefore, the term "dicarboxylic acid" includes also an ester of a dicarboxylic acid which ester has a molecular weight higher than 300, or any other dicarboxylic acid derivative having a molecular weight greater than 300, provided that the corresponding acid has a molecular weight below about 300. The dicarboxylic acids may contain any substituent groups or any combination of substituent groups which do not significantly interfere with the formation of the copolyester polymer and with the use thereof in the end products according to the present invention.

Within the context of the present invention, by "aliphatic dicarboxylic acids" those carboxylic acids are meant which contain two carboxylic groups, each attached to a saturated carbon atom. If the carbon atom to which the carboxylic group is attached is a saturated one and is part of a ring, the acid is cycloaliphatic. Generally, aliphatic acids or cycloaliphatic acids containing a conjugated unsaturation cannot be used, in that they are liable to homopolymerize. However, some unsaturated acids such as, e.g., maleic acid and the dimer or trimer of oleic acid can be used.

The term "aromatic dicarboxylic acids" as used herein refers to dicarboxylic acids having two carboxylic groups, each carboxylic group being attached to a carbon atom in an isolated or fused benzene ring. It is not necessary that both carboxylic groups be attached to the same aromatic ring, and, where more than one ring is present, said rings may be linked through divalent aliphatic or aromatic radicals or through divalent radicals such as, e.g., —O— or —$SO_2$—, or even by a carbon-carbon single bond.

Examples of aliphatic and cycloaliphatic dicarboxylic acids which can be used for preparing the copolyether-esters of the present invention are sebacic acid, 1,3-cyclohexane-dicarboxylic acid, 1,4-cyclohexane-dicarboxylic acid, adipic acid, glutaric acid, succinic acid, oxalic acid, azelaic acid, diethyl-malonic acid, allyl-malonic acid, 4-cyclohexane-1,2-dicarboxylic acid, 2-ethylsuberic acid, 2,2,3,3-tetramethyl-succinic acid, cyclopentane-dicarboxylic acid, decahydro-1,5-naphthalene-dicarboxylic acid, 4,4'-dicyclohexyl-dicarboxylic acid, decahydro-2,6-naphthalene-dicarboxylic acid, 4,4'-methylene-bis-(cyclohexyl)-carboxylic acid, 3,4-furan-dicarboxylic acid, 1,1-cyclobutane-dicarboxylic acid, etc.

Cyclohexane-dicarboxylic acid and adipic acid are preferred dicarboxylic acids.

Examples of aromatic dicarboxylic acids which can be used comprise phthalic acid, isophthalic acid, terephthalic acid, dibenzoic acid, dicarboxylic compounds substituted with two benzene rings, such as, e.g., bis-(para-carboxy-phenyl)-methane, para-oxy-(para-carboxy-phenyl)-benzoic acid, ethylene-bis-(para-oxybenzoic acid), 1,5-naphthalene-dicarboxylic acid, 2,6-naphthalene-dicarboxylic acid, 2,7-naphthalene-dicarboxylic acid, phenanthrene-dicarboxylic acid, anthralene-dicarboxylic acid, 4,4'-sulfonyl-dibenzoic acid, thiofurazane-3,4-dicarboxylic acid, as well as their $C_1$-$C_{12}$-alkyl esters and derivatives resulting from substitution on the ring, such as, e.g., halo, alkoxy, and aryl derivatives.

Aromatic acids containing a hydroxy group, such as, e.g., para-($\beta$-hydroxy-ethoxy)benzoic acid, may also be used, provided that an aromatic dicarboxylic acid is also present.

The aromatic dicarboxylic acids constitute a preferred class for preparing the copolyether-ester polymers of the compositions of the present invention.

Among the aromatic acids, those with from 8 to 16 carbon atoms are preferred; particularly preferred are phenylene-dicarboxylic acids, i.e., phthalic acid, isophthalic acid and terephthalic acid. In particular, either terephthalic acid alone or a mixture of terephthalic acid and isophthalic acid are preferred.

At least about 70% by mol of the dicarboxylic acid included in the polymer are preferably composed of terephthalic acid, i.e., about 70% of the "R" groups in formulae (V) and (VI) above are preferably 1,4-phenylene radicals.

The carboxylic acids or their derivatives and the polymeric glycols are included in the final products in the same molar proportions in which they are contained in the reaction mixtures. The actually included amount of low-molecular weight diol corresponds to the difference between the mols of diacid and the mols of polymeric glycol contained in the reaction mixture.

The most preferred copolyether-esters of the present invention are those prepared form terephthalic acid (TPA), 1,4-butanediol (BD), and polytetramethyleneglycol (PTMG) having an average molecular weight of from about 250 to about 4,500 and, optionally, isophthalic acid (IPA) in an amount not higher than about 5% by weight with respect to the total amount of the two acids.

The polymers of the compositions of the present invention may suitably be prepared by means of a normal transesterification reaction. A preferred process comprises heating, at 150°-230° C., the ester of the dicarboxylic acid (for example the dimethyl ester of terephthalic acid) with the poly(alkylene oxide) glycol and a molar excess of a diol, in the presence of a catalyst. The amount of the diol is at least 1.1 mole of diol per each mole of acid.

The heating is continued until the removal of methanol is essentially complete.

The resulting prepolymer is then carried to high molecular weight by distillation under vacuum of the excess of the low molecular weight diol (polycondesation). During this distillation, additional transesterification occurs, which leads to an increase in molecular weight and to a random arrangement of the various copolyester units in the molecule.

In order to avoid an excessively long hold time of the polymer at high temperatures with possible irreversible thermal degradation, catalysts for the ester-interchange reaction are advantageously employed. While a wide variety of catalysts can be employed, organic titanates, such as, e.g., tetrabutyl titanate, either alone or in combination with magnesium or calcium acetates, are preferred. Complex titanates derived from alkali or alkaline-earth metal alkoxides and esters of titanic acid are also very effective. Inorganic titanates, such as lanthanium titanate, mixtures of calcium acetate and antimony dioxide, and lithium and magnesium alkoxides are further examples of catalysts which can be used.

The ester-interchange polymerizations are generally carried out in the molten state, but inert solvents can also be used to facilitate the removal of volatile components from the mass by operating at lower temperatures.

During the preparation of the elastomeric thermoplastic copolyether-ester it is common practice to add a stabilizer in order to prevent an oxidative and hydrolytic degradations of the reagents and of the polymer during its formation. The known phenolic stabilizers can be used for this purpose.

The synergistic mixture of tris(hydroxy-benzyl) benzene (I) and bis(alkyl-phenyl) pentaerythritol phosphite (III) may be added to the copolyether-ester either during the polycondensation reaction, at the end of this reaction when the polymer is again in the molten state, or after this reaction in a separate step by re-melting the copolyether-ester in an extruder.

The synergistic mixture may be added in the form of a solid, a liquid in the molten state or in solution or dispersion in one or more of the reagents. It is generally suitable to add the synergistic mixture in the solid form to the finished copolyether-ester by melt blending.

In this last case, it is possible to preparare a master batch of the stabilizer, for example having a concentration of synergistic mixture of 20–40% by weight, and then to dilute this master batch with the pure copolyether-ester. This blending is preferably carried out in an extruder at a temperature of from 150° to 280° C., depending on the particular type of copolyether-ester; the extruder may be of the single-screw or double-screw type, preferably equipped with venting, or a Banbury mixer.

The copolyether-esters stabilized with the synergistic mixture employed in the present invention exhibit a high resistance to the thermo-oxidation and to the hydrolysis.

Owing to these peculiar properties, the stabilized copolyether-ester compositions of the present invention find use in the production of hydraulic pipes, coatings for cables, elastic supports for bumpers, bellows for covering joints or couplings, composite gaskets or, generally, shaped articles to be used at high operating temperatures, generally higher than 120° C.

The characteristics of the copolyether-esters of the present invention may be further modified by the incorporation of various conventional inorganic fillers, such as, e.g., carbon black, silica gel, alumina, clay, fiberglass, etc. In general, the effect of these additives is to increase the modulus of the material, although at the expense of elongation, tear strength and abrasion resistance.

Besides the above, the product may be rendered flame-proof (UL 94 Class: V2, V0, etc.) by the addition of various flame-proofing systems containing aromatic halides, aliphatic halides or not containing halogen atoms, in amounts ranging from 5 to 45% by weight based on the final product.

As conventional flame-proofing systems, there may be used decabromo-bisphenol A with $Sb_2O_3$ in the ratio of 1.5:1, or flame-proofings substances such as melamine hydrobromide (see published Italian patent application No. 20548 A/85) combined with $Sb_2O_3$ in the ratio of 3:1, or, finally, synergistic systems halogen-free, such as acid piperazine pyrophosphate combined with melamine phosphate in the ratio ranging from 3:1 to 1:1 see published Italian patent application No. 21,149 A/83).

In order to make the present invention still better understood, some examples are reported below which are of a merely illustrative character, and no way are limitative of the invention.

All parts, proportions and parameters given in the following are by weight, unless otherwise specified.

EXAMPLES 1 to 4

Dimethyl-terephthalate, optionally isophthalic acid, 1,4-butane-diol and poly(tetramethylene oxide) glycol (PTMG) having different average molecular weights were charged, in the amounts listed in Table I, into an autoclave equipped with distillation column, variable-speed stirring means and temperature control system.

The temperature was gradually increased to 140°-150° C. over about 1 hour and 150 ppm of Ti(O-Bu)$_4$, previously dissolved in a few ml of butane-diol (about 10-20 ml), were added. After a short induction period, the transesterification reaction started; this reaction was evidenced by an increase of the temperature in the distillation column overhead to about 65° C., which indicated the removal of methanol. The temperature of the reaction mass was gradually increased up to 205° C. (over 2 hours) and was kept constant at this value until the methanol distillation was complete.

150 ppm of catalyst (tetrabutyl titanate) and about 4,000 ppm of a phenolic stabilizer (Irganox® 1010, produced and sold by CIBA GEIGY) were added and vacuum was gradually applied until a residual pressure of about 0.05 mm Hg was reached (within about 30 minutes) and heating was continued until an internal temperature of about 250° C. was reached.

When the product had reached the desired melt index, about 200-600 Pa. sec at 232° C., corresponding to a melt index between 15-30 g/10 min., the polymer was discharged by extrusion onto a water-cooled conveyor belt, and was chopped into small cubic granules.

The properties of the obtained copolyesters are listed in Table I.

TABLE I

| Monomers | Method | UNITS | 1 | 2 | 3 | 4 |
|---|---|---|---|---|---|---|
| Dimethylterephthalate | | | 455 | 498 | 644 | 613 |
| Isophthalic acid | | | | | | 23 |
| 1,4 - butene-diol | | | 212 | 244,6 | 353 | 224 |

TABLE I-continued

| Monomers | Method | UNITS | 1 | 2 | 3 | 4 |
|---|---|---|---|---|---|---|
| PTMG having a mol. weight 250 | | | | | | 263 |
| PTMG having a mol. weight 650 | | | | | | 117 |
| PTMG having a mol. weight 1000 | | | 530 | 477,8 | 296 | — |
| PROPERTIES | | | | | | |
| Melting point | D 2117 | °C. | 182 | 191 | 209 | 160,5 |
| Glass transition temperature | DIN 53445 | °C. | −60 | −50 | −12 | −41 |
| Melt Index at 230° C. and 2.16 Kg | D 1238 | g/10′ | 20 | 21 | 18 | 21 |

EXAMPLE 5

The elastomeric thermoplastic copolyester of example 2 was mixed at 190°-195° C. in a double-screw extruder MARIS M33 type, with 20% by weight of a stabilizer listed in Table II. The thus obtained master was added to the respective pure copolymer so as to obtain compounds containing 0.5%, by weight of stabilizer. The thus stabilized products was injection molded at about 200° C. and the physical-mechanical and technologycal properties were measured.

The obtained values are listed in following Table II.

TABLE II

| COPOLYETHER-ESTER OF EXAMPLE 2 | | | Without any | ULTRANOX | ETHANOX | ULTRANOX 626 and |
|---|---|---|---|---|---|---|
| PROPERTIES | METHOD | UNITS | addition | 626 | 330 | ETHANOX 330 1:2 |
| Hardness | D 2240 | Punti | 46 | 46 | 46 | 46 |
| Tensile strength | D 638 | MPa | 23 | 22.7 | 23.0 | 22.6 |
| Elongation at break | D 638 | % | 700 | 690 | 670 | 750 |
| Melt Index at 230° C. and 2.16 Kg. | D1238 | g/10′ | 21 | 21 3 | 20 2 | 21 |
| RESISTANCE IN WATER (*) | | | | | | |
| Tensile strength | D 638 | MPa | 15 | 12.4 | 16.7 | 21.9 |
| Elongation at break | D 638 | % | 170 | 216 | 550 | 700 |
| RESISTANCE IN OIL (**) | | | | | | |
| Tensile strength | D 638 | MPa | 16.0 | 17.5 | 19.0 | 22.5 |
| Elongation at break | D 638 | % | 430 | 500 | 480 | 680 |
| RESISTANCE TO THERMO-OXIDATION (***) | | | | | | |
| Tensile strength | D 638 | MPa | 16 | 21.4 | 19.9 | 22.4 |
| Elongation at break | D 638 | % | 400 | 670 | 700 | 685 |

(*) The resistance in water was determined after dipping the example in water at 100° C. for 7 days.
(**) The resistance in oil was determined after dipping the example in oil ASTM N,3 at 100° C. for 7 days
(***) The resistance to thermo-oxidation was determined after standing the example in an oven at 121° C. for 7 days.

EXAMPLES 6-8

By operating according the process conditions of example 5, stabilized compositions with the copolyesters of examples 1, 2 and 3 were prepared. The properties of the thus obtained stabilized compositions are listed in following Table III.

TABLE III

| COPOLYETHER-ESTER OF EXAMPLE | | | 1 | | 3 | | 4 | |
|---|---|---|---|---|---|---|---|---|
| PROPERTIES | METHOD | UNITS | Without addition | MS (1) | Without addition | MS (1) | Without addition | MS (1) |
| Tensile strength | D 638 | MPa | 19 | 18,8 | 34 | 34 | 18 | 17 |
| Elongation at break | D 638 | % | 800 | 820 | 700 | 750 | 850 | 870 |
| Melt Index | D 1238 | g/10′ | 20 | 20 | 18 | 20.7 | 21 | 22 |
| RESISTANCE TO WATER (*) | | | | | | | | |

TABLE III-continued

| COPOLYETHER-ESTER OF EXAMPLE | | | 1 | | 3 | | 4 | |
|---|---|---|---|---|---|---|---|---|
| PROPERTIES | METHOD | UNITS | Without addition | MS (1) | Without addition | MS (1) | Without addition | MS (1) |
| Tensile strength | D 638 | MPa | 13 | 17 6 | 24 | 29 | 12 | 17 1 |
| Elongation at break | D 638 | % | 180 | 650 | 150 | 480 | 200 | 690 |
| RESISTANCE TO OIL (**) | | | | | | | | |
| Tensile strength | D 638 | MPa | 17 | 18.7 | 28 | 30 | 16 | 16.9 |
| Elongation at break | D 638 | % | 700 | 790 | 700 | 640 | 850 | 800 |
| RESISTANCE TO THERMO-OXIDATION (***) | | | | | | | | |
| Tensile strength | D 638 | MPa | 15.2 | 19.1 | 27.7 | 34.4 | 13 | 17.5 |
| Elongation at break | D 638 | % | 420 | 800 | 320 | 670 | 350 | 850 |

(1) MS = Synergistic mixture consisting of ULTRANOX 626 and ETHANOX 330 in the weight ratio 1:2.
(*) Determined according the method of Table II
(**) Determined according the method of Table II
(***) Determined according the method of Table II.

We claim:

1. Elastomeric thermoplastic copolyether-esters having improved resistance to thermo-oxidation and to hydrolysis, having incorporated therein an effective amount consisting essentially of a synergistic mixture consisting of a tris(hydroxy-benzyl) benzene and a bis-(alkyl-phenyl) pentaerythritol diphosphite,
    wherein the tris(hydroxy-benzyl) benzene has general formula

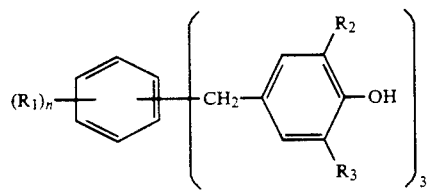
(I)

wherein: $R_1$, $R_2$ and $R_3$, which may be the same to or different from each other, represent a $C_1$–$C_8$ alkyl group and n is an integer having a value from 1 to 3, and
wherein the bis(alkyl-phenyl) pentaerythritol diphosphite has the general formula:

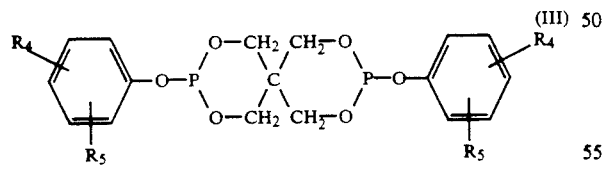
(III)

wherein $R_4$ and $R_5$, which can be the same or different from each other, are alkyl radicals containing from 1 to 10 carbon atoms.

2. Elastomeric thermoplastic copolyether-esters according to claim 1, wherein at least one of the $R_2$ and $R_3$ radicals are alkyl radicals containing from 3 to 8 carbon atoms and are branched on the carbon atom in the alpha position.

3. Elastomeric thermoplastic copolyether-esters according to claim 1, wherein the tris(hydroxy-benzyl) benzene is a 1,3,5-trialkyl-2,4,6-tris(3,5-dialkyl-4-hydroxy-benzyl)benzene of formula (II):

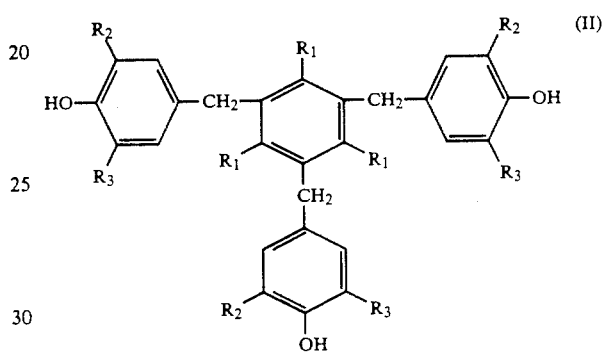
(II)

wherein $R_1$, $R_2$ and $R_3$ have the meanings set forth in claim 1.

4. Elastomeric thermoplastic copolyether-esters according to claim 1, wherein the tris(hydroxy-benzyl)-benzene is 1,3,5-tri-methyl-2,4,6-tri(3,5-di-tert butyl-4-hydroxybenzyl)benzene.

5. Elastomeric thermoplastic copolyether-esters according to claim 1, wherein the bis(alkyl-phenyl)-pentaerythritol diphosphite has general formula:

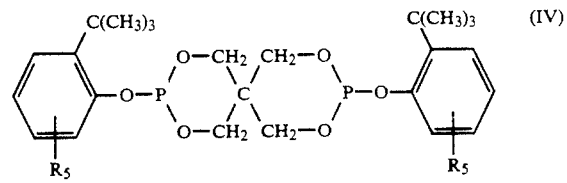
(IV)

wherein $R_5$ is an alkyl radical containing from 1 to 6 carbon atoms.

6. Elastomeric thermoplastic copolyether-esters according to claim 5, wherein the bis(alkyl-phenyl)pentaerythritol diphosphite is bis(2,4-di-tert.butyl-phenyl)-pentaerythritol diphosphite.

7. Elastomeric thermoplastic copolyether-esters according to claim 1, wherein the amount of the stabilizing system is between 0.01 and 10% by weight with respect to the elastomeric copolyether-ester.

8. Elastomeric thermoplastic copolyether-esters according to claim 1, wherein the weight ratio between the bis(alkyl-phenyl)pentaerythritol diphosphite and the tris(hydroxy-benzyl)benzene is between 3:1 and 1:3.

9. Elastomeric thermoplastic copolyether-esters according to claim 8, wherein the weight ratio between bis(alkyl-phenyl)pentaerythritol diphosphite and the tris(hydroxybenzyl)benzene is 2:1.

10. Elastomeric thermoplastic copolyether-esters according to claim 1, wherein said copolyether-ester consists of a multiplicity of repeating long-chain ester units and of short-chain ester units, joined to each other by head-to-tail connections through ester bonds; the long-chain ester units being represented by the formula:

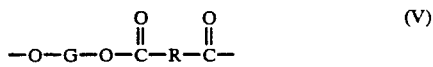
(V)

and the short-chain units being represented by the formula:

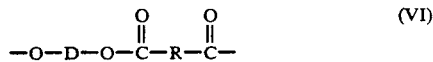
(VI)

wherein:
G is a divalent radical remaining after the removal of the end hydroxyl groups from a poly-(alkylene oxide)-glycol having a molecular weight comprised between approximately 250 and 6,000 and a carbon/oxygen ratio of approximately 1.8–4.3;
R is a divalent radical remaining after the removal of the carboxyl groups from a dicarboxy acid having a molecular weight lower than about 300; and
D is a divalent radical remaining after the removal of hydroxyl groups from a diol having a molecular weight lower than about 250, and wherein the short chain ester corresponding to the above formula (VI) is present in an amount of about 15–95% by weight, with respect to the weight of the co-polyester, the remaining part being constituted by long-chain ester units corresponding to the formula (V).

11. Elastomeric thermoplastic copolyether-esters according to claim 1, wherein said copolyether-ester is prepared from terephthalic acid, 1,4-butanediol and polytetramethyleneglycol having an average molecular weight of from about 250 to about 4,500 and, optionally, isophthalic acid in an amount not higher than about 5% by weight with respect to the total amount of the two acids.

12. Elastomeric thermoplastic copolyether-esters according to claim 1, containing in addition from 5 to 45% by weight of a flame-proofing agent selected from the group consisting of the aromatic halides, aliphatic halides and the synergistic flame-proof halogen-free system.

13. Elastomeric thermoplastic copolyether-esters according to claim 1, wherein the amount of the stabilizing system is between 0.2 and 5% by weight.

14. Elastomeric thermoplastic copolyether-esters according to claim 1, wherein both of the $R_2$ and $R_3$ radicals are alkyl radicals containing from 3 to 8 carbon atoms and are branched on the carbon atom in the alpha position.

15. Elastomeric thermoplastic copolyether-esters according to claim 10, wherein the short chain ester corresponding to formula (VI) is present in an amount of 33–96% by weight, with respect to the weight of the copolyester.

* * * * *